March 3, 1959
P. R. HEYMÈS
2,875,557
APPARATUS FOR SURFACING GLASS
Filed Aug. 12, 1955
2 Sheets-Sheet 1
Fig.1
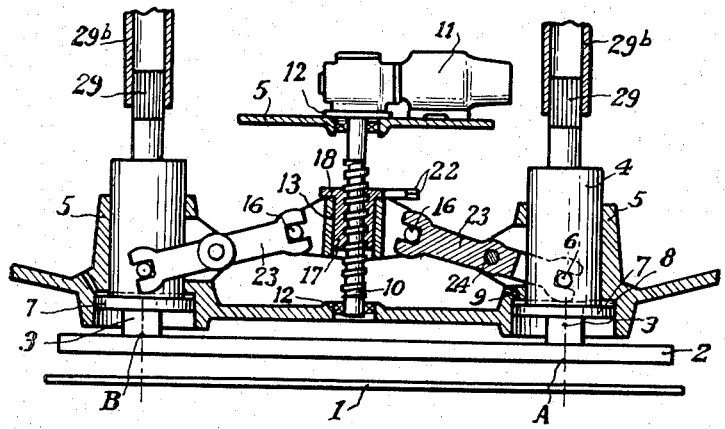
Fig.2
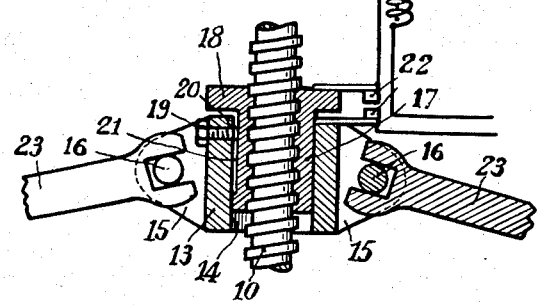
Fig.3
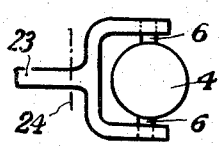
Fig.4
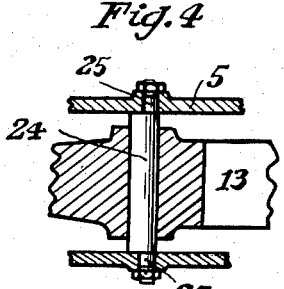
Fig.6
INVENTOR
PIERRE R. HEYMES
BY
Bauer & Seymour
ATTORNEYS

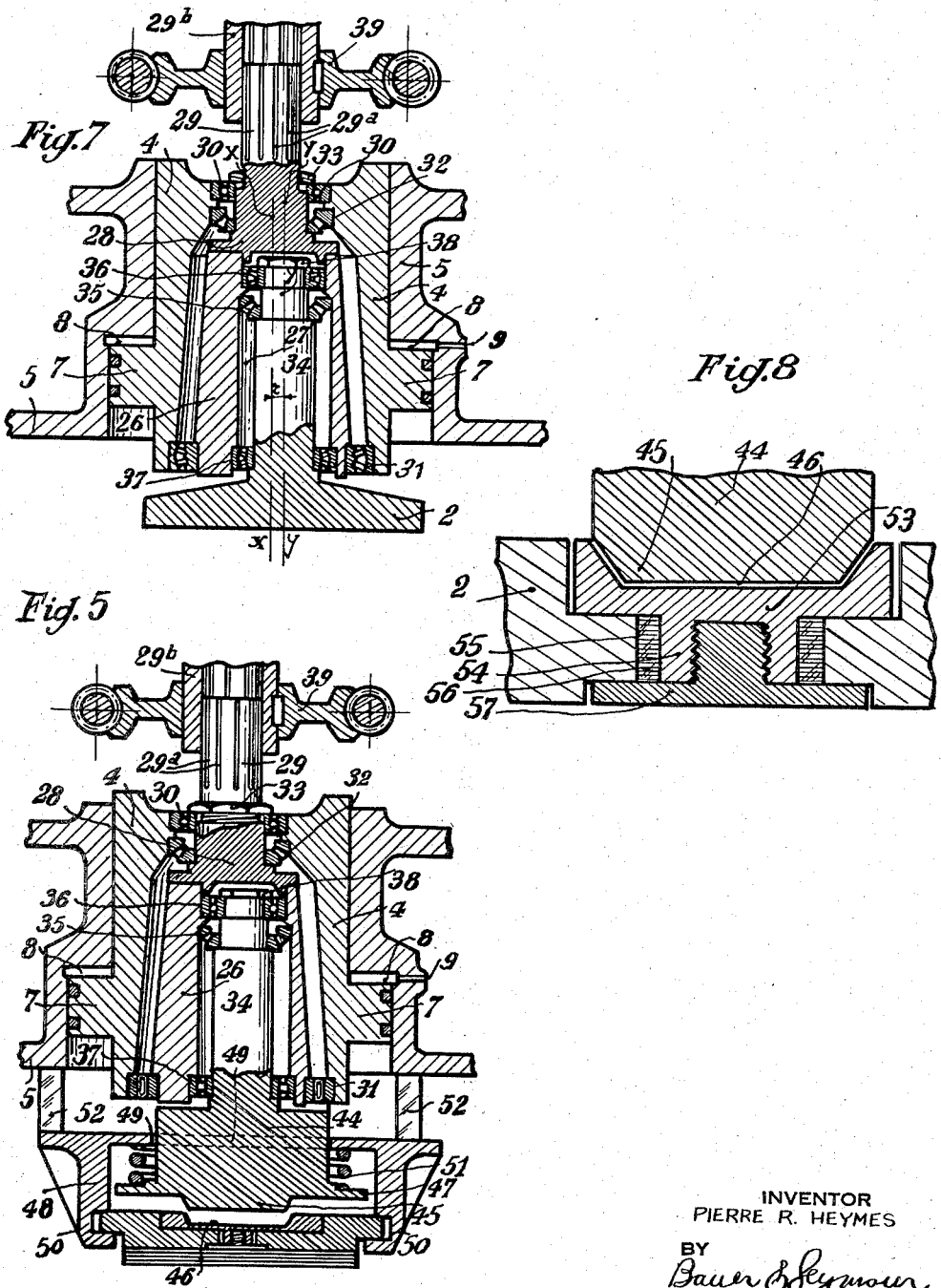

United States Patent Office 2,875,557
Patented Mar. 3, 1959

2,875,557
APPARATUS FOR SURFACING GLASS

Pierre René Heymès, Paris, France, assignor to ST Anonyme des Manufactures des Glaces et Produits Chimiques de ST-Gobain, Chauny et Cirey, Paris, France Application August 12, 1955, Serial No. 528,098

Claims priority, application France August 12, 1954

15 Claims. (Cl. 51—119)

The invention relates to an apparatus for grinding or polishing glass sheets or the like materials by surfacing tools moving in contact with the surface to be worked.

There is disclosed in application Ser. No. 288,824, filed May 20, 1952, now Patent No. 2,787,100, April 2, 1957, a method of grinding and polishing glass by means of a runner which describes a periodic translatory motion along closed directing curves, for example circles, across the whole width of the glass that is to be surfaced, and is of uniform width in the direction of movement of the glass. Material problems have existed in the implementing of the theory, among which are those of securing uniform pressure at opposite ends of a long runner, of correlating the driving mechanism that produces the said periodic motion so that the parts of the runner move together without contrary motion, of compensating for runner wear, and of constructing a mechanism capable of accomplishing these objects in a mechanically practicable and efficient manner.

It should be stated that the fluid exerting pressure may be either liquid or gas, and that it is preferably applied so as to produce equal pressure on all parts of the runner, for instance by supporting the runner on pistons supplied by the same source of fluid pressure such as from a single master cylinder connected to operating cylinders of identical size.

An object of the present invention is to provide means to impart to the surfacing tool a circular translatory motion in which each and every point of the surfacing tool has the same and equal movement along parallel paths, the path of each point being a circumference of a given radius. This is also called homocircular motion such as it is, for example, described in Patent No. 2,787,100. This same rotating motion is imparted to the surfacing tool at two or several points rotating in synchronism.

Another object of the invention is to provide simple and efficient means, in an apparatus of the character above specified, for movement of the surfacing tools perpendicularly to the surface to be worked and for bringing the tools in contact with the said surface and for maintaining said surfacing tools in contact with it as the working surface of said tools is worn away.

Another object of the invention is to secure the application to the surface being worked of a pressure throughout its length and equally to the different points of the working surface.

Another object is to apply fluid pressures to surfacing machines, particularly to elongated tools which operate upon moving sheets of glass, and to provide means for bringing such surfacing tools into engagement and removing them from glass so that substantially uniform contact is made or terminated throughout the area of the tool.

Another object is to provide a glass surfacing apparatus of translatory motion type which is capable of ready adjustments in all its parts, so that any imperfections in its motions may be promptly corrected.

Other objects and advantages of the invention will become apparent as the following detailed description proceeds and are not to be taken as limiting the generality of the claims.

The following description and the accompanying drawings illustrate, by way of example, an apparatus for carrying the invention for polishing the upper face of a moving, horizontally positioned, glass sheet by means of a polishing tool of general rectangular shape driven through a plurality of its points located in its longitudinal plane of symmetry.

In the accompanying drawings:

Fig. 1 is a diagrammatic view partly in vertical section along its longitudinal plane of symmetry of an apparatus embodying major principles of the invention.

Figs. 2, 3 and 4 are largely vertical sections through elements of this device on a larger scale, Fig. 5 is a partial vertical section of an alternative form of the driving member and of the polishing shoe, showing their connection.

Fig. 6 is a schematic drawing of a device for synchronizing the rotation of two driving devices according to Fig. 5.

Fig. 7 is a vertical partial section, through the axis of the rotating device driving one zone of the polishing shoe, showing details of construction.

Fig. 8 is a detailed section of a connection shown more generally in Fig. 5.

Referring to Figs. 1 to 4, 1 is a glass sheet, 2 a polishing shoe of elongated, generally rectangular shape supported at points A and B which are located in the vertical plane of symmetry of said tool, by identical driving devices comprising elements 3, bearing in cylindrical sleeves 4 which may slide in the frame 5 of the polishing apparatus and which are provided, on their lateral surface, with two pins 6 diametrally located.

Each sleeve 4, respectively, is connected with a disc 7, movable in a cavity 8, provided in the frame 5, as a piston in a cylinder. The displacement of this disc is limited to a few centimeters, corresponding to the utilisable thickness of the pads. Through an opening 9, the upper chamber of each cylinder 8 communicates with a common supply of fluid such as compressed air or liquid, not shown in the drawing.

A worm 10, preferably square threaded, may be rotated around its axis, in both directions, by a driving unit 11, comprising a motor and a reducing gear, to which it is connected. The worm 10 is mounted on roller bearings 12, located in the frame 5.

A central piece 13 is provided with a cylindrical opening 14 and comprises two ears 15 diametrally located, each made of two parallel flanges. A cross pin 16 connects both flanges of each ear near their ends. The central piece 13 slides smoothly on a central guide 17, provided with internal threads corresponding with those of worm 10 and screwed on the latter. This guide is provided with an annular flange 18 at its upper part. In order to prevent the central guide 17 from being rotated by the worm 10, and with the purpose of forcing it to move along said worm, a pin 19, screwed on piece 13, has its extremity 20 engaged in a slot 21 of guide 17. Two electric contact pieces, represented here by two contact points 22, are affixed, in confronting relationship, on the central piece 13 and on the guide 17, respectively. These pieces are inserted in an electric circuit controlling the operation of the motor of the driving unit 11. A schematic drawing of the electrical apparatus for the control of the motor is shown on Fig. 2.

Two arms 23—23 connect the central piece 13 to the respective sleeves 4. Each arm has the shape of a fork as shown in Fig. 3, and is pivoted on axis 24, the cylindrical body of which is eccentric relatively to its threaded ends 25 (Fig. 4) which are fixed on the frame 5 by means of nuts. The purpose of this eccentric axis will appear as the description proceeds.

Each end of arm 23 is notched. The length and depth of these notches are adequate for engaging cross pin 16 on one side and pin 6 on the other, whilst allowing sufficient longitudinal clearance for the angular displacement of the arm.

Before starting the device for bringing the surfacing tool into contact with the glass sheet, the respective positions of the various parts are as shown in Fig. 1. The polishing shoe 2 is spaced a few centimeters from the glass sheet 1, the pistons 7 are at the upper part of cylinders 8, the central piece 13 abuts the flange 18 of guide 17, and the two contacts 22—22 are in engagement. The driving unit 11 is then started so as to rotate the worm 10 in the sense corresponding to the ascent of guide 17 along the threads of said worm. Now the central piece 13, not being held back by the rim 18 of the guide, is driven by the screw to ascend, consequently permitting the sleeves 4 and the polishing shoe 2 to be lowered towards the glass sheet by the fluid pressure in the upper chambers of the cylinders 8.

When the shoe contacts the glass sheet, its motion stops thus causing the sleeves 4 and the central piece 13 to stop. The worm 10 goes on rotating, however, so that the guide 17 goes on ascending until the contacts 22—22 separate, thus interrupting the circuit of the motor.

If necessary, the even application of the rubbing surface of the polishing shoe to the glass sheet is completed by adjusting the vertical position of one of the sleeves 4 relatively to the other. It may be seen in Fig. 4 that the adjustment is made by rotating one of the eccentric axes 24 in the frame 5, thus changing the position of the corresponding arm 23. When the shoe has been brought evenly into contact with the plane of the glass sheet, the axis 24 is locked in position on frame 5.

The pressure of the fluid, for instance compressed air, fed into the upper chambers of the cylinders 8 through the feeding inlets 9 is transmitted to the shoe 2 and insures a regular pressure of all the rubbing surface of said tool on the glass sheet.

During the polishing operation, the working face of the shoe is progressively worn away, but is in even contact with the glass sheet, and exerts continuously on it the required pressure, under the action of the fluid in chambers of the cylinders 8. Consequently the surfacing tools are progressively lowered, carrying with them the sleeves 4. Simultaneously, the central piece 13 is progressively raised until its abuts the annular flange 18, but as the contacts 22—22 engage, the motor stars, rotates worm 10, and the guide 17 ascends until the contacts 22 separate again. Thus during the upward movement of guide 17, the central piece 13 is free from pressure and may be raised so that the shoe remains applied to the glass sheet under the action of fluid pressure, without any mechanical pressure.

When the working surface of the surfacing tools is worn out, the pistons 7 are at the end of their run and the shoe is then lifted for replacement. For that purpose, the motor is reversed, rotating the screw in reverse, thus causing the guide 17 to be lowered and to lift the elements 4, and the shoe. The central piece 13 is thus pushed down by the flange 18, the various parts finally come to the respective positions shown in Fig. 1, and it is then possible to replace the shoe.

The way of imparting to the surfacing tool its circular translatory motion will now be described, with reference to Fig. 5, the shoe being there shown as lowered and exerting the required pressure on the glass sheet.

For this purpose, identical rotations are imparted to both points A and B of this polishing shoe by means of the driving element 26, shown in Fig. 7. This rotating element has a shaft 29 with an axis X—X. The lower part of the element is drilled eccentrically as at 27 and is thus provided with a cylindrical opening 27 whose vertical axis Y—Y is parallel to but separated from the axis X—X.

The driving element 26 is mounted on a shoulder 28 at the end of a cylindrical shaft 29. The shaft 29 of driving element 26 is splined at 29a and fits within the grooved, rotatable driving sleeve 29b to which rotation is imparted by the power used to impart translating motion to the runner. Rotation is secured by a motor, not shown in the figure. This arrangement provides a telescopic connection between the motor and the element 26, allowing vertical motions of the latter, such motions being necessary to bring the surfacing tool in contact with the glass sheet or to remove it, or to compensate for the wear of the working face.

The driving element 26 revolves inside the sleeve 4, which may be raised or lowered, as appears from the description of Fig. 1.

Between member 26 and sleeve 4 are bearings 30, 32, 31 which support the rotation of the runner and transmit the thrust of the piston thereto. Bearing 30 is preferably of ball bearing type. Bearing 31 is preferably of roller type and bearing 32 is preferably a thrust bearing. A nut 33, screwed on a threaded part of shoulder 28 is used to seat driving element 26 in place.

In the cylindrical recess 27 of the driving member 26 is located a shaft 34, which corresponds, in this figure to part 3 of Fig. 1. This shaft 34, is fixed to the surfacing tool 2, and is supported in driving element 26 by a thrust bearing 35, and a ball bearing 36. It is laterally guided by a roller bearing 37, which may be advantageously of the cylindrical roller bearing type.

A nut 38, screwed at the top of the driven element 34, assembles the parts, which is permitted by constructing elements 26—28 in two parts as indicated by shading in Figs. 5 and 7.

The working of the apparatus described above is as follows:

The surfacing tool 2 being brought in contact with the glass sheet 1 by the downward motion of sleeves 4, and the pressure required for the operation being also transmitted from the pistons to the surfacing tool through the same sleeves, each driving element 26 is revolved about its axis X—X for instance through an individual motor connected to hollow shaft 29b. Each axis Y—Y describes a cylinder about axis X—X, the radius r of which equals the distance separating them. During this motion, all points on driven elements 34 and surfacing tool 2 describe circumferences of radius r. This radius may be as large or as small as desired.

The rotation of both driving members 26 must be synchronized when they are driven by individual motors, in part becouse of the lost motion of the motors under load. For this purpose (Figs. 5 and 6) a sprocket 39 is keyed on each sleeve 29b, such sprocket meshing with an endless chain 40. In this arrangement, a tightening mechanism made of two rollers 41—41 rolling on the chain and adjustable along an operating arm 42, may be used for tightening the chain, screw and gear unit fixed to the frame of the apparatus permit adjustment.

In order to adjust the respective positions of both axes Y—Y so as to bring their rotation in synchronism, one of the sprockets 39 may be freed from the chain and brought by rotation to the exact position desired. Then, by actuating the tightening mechanism both pinions are meshed with the endless chain.

In order to make more understandable the preceding description it has been assumed so far that the surfacing tool 2 was directly linked with the driven elements 3—3. It is however advisable, in practice, to mount the surfacing tool detachably on the mechanism driving it, so as to allow for quick replacement of the surfacing tool without interrupting the operation for a long period of time.

The construction of such a detachable mounting is shown in Fig. 5. The shaft 34, has, on the extremity directed toward the surfacing tool, a head 44, comprising a tapering protuberance 45, which may be inserted into a corresponding depression 46 of the surfacing tool and an annular flange 47.

A casing 48, of general parallelepipedic shape, enables one to link the surfacing tool 2 with the head 44, into which it enters through an orifice 49 bored in the bottom of the latter. The casing is provided with lateral grooves 50—50, in which are lodged the lateral edges of the surfacing tool. A spiral spring 51, highly compressed, holds the surfacing tool in these grooves. For this purpose, the said spring rests on the bottom of the casing and on the annular rim 47 of the driven element.

When the tapering protuberance 45 is inserted in the housing 46 of the surfacing tool, the action of the spring 51 locks the surfacing tool in position in the grooves of the casing.

In order to release the surfacing tool 2′, for instance for the purpose of replacement, the sleeves 4 are lifted and with them the members 34. At the beginning of this operation, each of these members 34 carries the casing upward with it while the surfacing tool remains locked, in the grooves of the casing under the action of spring 51. But, as the upward motion continues, the upper part of the casing engages stop-pieces 52, fixed on the frame 5, thus interrupting the upward motion of the casing whilst the upward motion of the head 44 goes on. Now the tapering protuberance 45 separates from the surfacing tool and the spring 51 releases the said tool in the grooves of the casing. It is then possible to remove the tool from the grooves and to extract it from the apparaus by sliding it in the said grooves.

Fig. 8 shows, on a larger scale than Fig. 5 the construction of an alternative connection which drives the surfacing tool.

This connection consists of a piece 53, whose upper part constitutes the housing proper receiving the tapered protuberance and whose lower cylindrical part 54 is inserted in an aperture 55, also cylindrical, purposely provided in the surfacing tool, the diameter of this orifice being much greater than that of the internally threaded boss 54. In the free annular space existing between the wall of aperture 55 and the boss 54 there is an expansion joint 56, of constant volume, e. g. filled with pitch, which is in place by a cover 57 screwed on boss 54, so that the set 53–57 is attached to the surface tool without being rigidly attached to it. The joint permits the longitudinal expansion of the surfacing tool between its driving elements while maintaining the position of their axis constant. Only one such joint is needed for a single shoe. The element not provided with an expansion joint is provided with a cylindrical part 54, fitting exactly in the cylindrical aperture 55. The set formed by piece 53 and cover 57 is, in this case, clamped on the surfacing tool.

From the dynamic point of view, the surfacing tool acts as a connecting rod driven at two points by elements which impart a circular translatory motion, one of these elements being rigidly connected to said surfacing tool and the other being connected (as shown in Fig. 8) through an elastic plastic joint so as to insure the synchronism of the rotation of the rotating elements, whilst allowing for longitudinal displacements caused by the expansion of the surfacing tool. It should be noted that only longitudinal displacements of the tool are possible, the tool being, as a matter of fact, laterally maintained in the grooves of the casing 48, the latter being itself always guided by the head 44. Consequently the casing follows exactly the motion of this head, which opposes all lateral displacement of the surfacing tool relatively to its median line.

One of the purposes of the polishing shoe is to distribute over the glass surface a pressure applied to said polishing shoe at some particular points. These pressures locally applied have a tendency to distort the rubbing surface so that the pressure exerted by it on the glass may not be uniform.

The location of the points of application of the pressure on the surfacing tool should be determined by computation or trial so as to avoid any appreciable local distortion of the rubbing surface and, occasionally, the rigidity of the surfacing tool will be improved by ribs or other means.

The invention includes the following concepts taken alone and together.

The movements of the surfacing tools to and from the glass sheet are imparted by sleeves slidable in the frame of the apparatus, by pivoted arms, the said arms being driven by a common central piece displaceable perpendicularly to the glass sheet. Said central piece moves along a worm revolvable about its axis and fixed to the frame of the apparatus.

Pressure is exerted on the surfacing tool by a fluid pushing on discs moving with the sleeves inside cylindrical apertures of the frame.

Circular translatory motions of the surfacing tool may be imparted by the rotation inside each sleeve of a driving member provided with a recess whose axis is eccentric relatively to the axis of rotation of said driving member. A driven element connected with the surfacing tool having an axis coinciding with the axis of the recess is mounted in the recess.

A casing, abutting both the sides of the surfacing tool and, through a spring, the element driving said surfacing tool, fixes said tool on surfacing tool when it is spaced from the glass sheet, abutting the stop pieces fixed on the frame.

At one point at least through which the translatory circular motion is imparted to the surfacing tool, the element connecting the driving element of the surfacing tool with said tool is mounted with longitudinal play relatively to its housing in the surfacing tool.

The surfacing tool has an elongated shape, and pressure is applied to two points of its vertical plan of symmetry.

I claim:

1. Glass surfacing apparatus including a surfacing tool, a plurality of rotatable supports attached to said surfacing tool at zones spaced longitudinally thereof, driving means attached to said supports to rotate them, lever means connected to said supports, means to raise and lower the parts of the levers attached to the supports, fluid pressure means comprising pistons attached to the supports to thrust the surfacing tool against the glass, and a source of fluid pressure connected to said pistons.

2. Glass surfacing apparatus including a surfacing tool, a plurality of rotatable supports attached to said surfacing tool, driving means attached to said supports to rotate them, lever means connected to said supports, means to raise and lower the parts of the levers attached to the supports, fluid pressure means comprising pistons attached to the supports and a source of fluid pressure connected to said pistons, and means to synchronise the rotation of said supports.

3. Glass surfacing apparatus including a surfacing tool, a plurality of rotatable supports attached to said surfacing tool, driving means attached to said supports to rotate them, lever means connected to said supports, means to raise and lower the parts of the levers attached to the supports, fluid pressure means comprising pistons attached to the supports and a source of fluid pressure connected to said pistons, and means to shift the fulcrum of each said lever means.

4. Glass surfacing apparatus including a surfacing tool, a plurality of rotatable supports attached to said surfacing tool, driving means attached to said supports to rotate them, lever means connected to said supports, means to raise and lower the parts of the levers attached to the supports, fluid pressure means comprising pistons attached to the supports and a source of fluid pressure connected to said pistons, said surfacing tool being attached to said mechanism by an expansion joint.

5. Apparatus for surfacing sheets of glass, comprising a grinding tool, supports for the tool connected thereto at a plurality of spaced locations on the tool, means for driving each of said supports in a circle of the same radius and in phase with each other whereby to impart a circular translatory motion to the tool in a plane parallel to the surface of the glass sheet, means including pivoted levers connected by a common central member for moving the supports toward and away from the sheet of glass, and means to apply the tool to the sheet of glass with grinding pressure, said last named means including fluid pressure cylinders acting upon a plurality of symmetrically located zones of the tool to advance the tool toward the sheet of glass.

6. Apparatus as set forth in claim 5, in which the fluid pressure cylinders are connected to the supports, the cylinders advancing the supports and the tool carried thereby toward the sheet of glass and applying the tool to said sheet of glass with grinding pressure.

7. Glass surfacing apparatus according to claim 5 in which the circular translatory motion of the surfacing tool is imparted by the rotation inside each sleeve of a driving member with a recess whose axis is eccentric relatively to the axis of rotation of said driving member, a driven element connected with the surfacing tool having an axis coinciding with the axis of the recess being mounted in the recess.

8. Glass surfacing apparatus comprising means for moving surfacing tools to and from the glass sheet to be worked, said means comprising at least two sleeves slidable in the frame of the apparatus, pivoted arms being controlled by a common central piece displaceable perpendicularly to the glass sheet by moving along a worm revolvable about its axis and fixed to the frame of the apparatus and at least one surfacing tool imparted with a circular translatory motion at at least two points rotating in synchronism by the rotation inside each sleeve of a driving member provided with a recess whose axis is eccentric relatively to the axis of rotation of said driving member, a driven element conected with the surfacing tool having an axis coinciding with the axis of the recess being mounted in the recess.

9. Glass surfacing apparatus according to claim 8 in which said common central piece includes a guide driven directly by the worm, means displaceable relatively to said guide and controlling said pivoting arms and means for rotating said worm and separating the guide from said displaceable means when contact is going to take place between said guide and said displaceable means, thereby the surfacing tool is applied on the sheet by the action of fluid pressure, without any mechanical pressure.

10. Glass surfacing apparatus comprising a surfacing tool imparted with a circular translatory motion, means for moving the surfacing tools to and from the glass sheet to be worked, said means comprising at least two sleeves slidable in the frame of the apparatus, pivoted arms being controlled by a common central piece displaceable perpendicularly to the glass sheet by moving along a worm revolvable about its axis and fixed to the frame of the apparatus, said common central piece including a guide driven directly by said worm means displaceable relatively to said guide and controlling said pivoting arms and means for rotating said worm and separating the guide from said displaceable means when contact is going to take place between said guide and said displaceable means, thereby the surfacing tool is applied on the sheet by the action of fluid pressure without any mechanical pressure.

11. Glass surfacing apparatus comprising means for moving the surfacing tools of elongated shape to and from the glass sheet with sleeves slidable in the frame of the apparatus, by pivoted arms, said arms being driven by a common central piece displaceable perpendicularly to the glass sheet, said central piece moving along a worm revolvable about its axis and fixed to the frame of the apparatus, means of exerting pressure on the surfacing tool to two points of its vertical plan of symmetry by a fluid pushing on discs moving with the sleeves inside cylindrical apertures of the frame, means of imparting circular translatory motions of the surfacing tool by the rotation inside each sleeve of a driving member provided with a recess whose axis is eccentric relatively to the axis of rotation of said driving member, a driven element connected with the surfacing tool having an axis coinciding with the axis of the recess being mounted in the recess, a casing abutting both the sides of the surfacing tool and through a spring the element driving said surfacing tool fixng said tool on said element when said tool is in contact with the glass sheet and freeing the surfacing tool when it is spaced from the glass sheet, abutting stop pieces fixed on the frame, means for mounting at one point at least, through which the translatory circular motion is imparted to the surfacing tool, the element connecting the driving element of the surfacing tool with said tool with longitudinal play relatively to its housing in the surfacing tool.

12. An apparatus for grinding or polishing sheets of glass comprising a rectangular grinding tool, means for imparting to the grinding tool translatory circular glass grinding movements, fluid pressure operated means for pressing the grinding tool with grinding pressure against the glass, and means to advance the grinding tool toward the glass, to withdraw the grinding tool from the glass, and to adjust the tool relative to the glass to compensate for its wear, said last-named means including a member reciprocable in a direction perpendicular to the glass, mechanical means for reciprocating said member, and a linkage connecting the member and the grinding tool, the member and the linkage being so constructed and connected to the grinding tool that they leave the grinding tool free to move with said circular translatory motion and so that the grinding pressure between the grinding tool and the glass is exerted substantially solely by said fluid pressure means.

13. Glass surfacing apparatus including a surfacing tool, a plurality of rotatable supports attached to said surfacing tool for giving to said tool a translatory motion along closed directing curves, driving means attached to said supports to rotate them, mechanical means for raising and lowering the tool, and means for applying fluid presure to a plurality of points of said tool.

14. Glass surfacing apparatus including a surfacing tool, a plurality of rotatable supports attached to said surfacing tool for giving to said tool a translatory motion along closed directing curves, driving means attached to said supports to rotate them, a member connecting said supports, mechanical means for raising and lowering said member, and means for applying fluid pressure to a plurality of points of said tool.

15. Glass surfacing apparatus including an oblong surfacing tool, a plurality of fluid means to press the surfacing tool against the glass which are connected to a single source of fluid pressure and act on a plurality of points of the tool symmetricaly distributed with respect to the longitudinal plane of symmetry of the tool, mechanical means to raise and lower the surfacing tool with respect to the glass, a plurality of means attached at spaced points of the surfacing tool for driving it with a circular translatory motion, and means to rotate the said means synchronously.

(References on following page)

References Cited in the file of this patent

UNITED STATES PATENTS

| | | |
|---|---|---|
| 1,705,918 | Harrington | Mar. 19, 1929 |
| 1,729,498 | Waldron | Sept. 24, 1929 |
| 1,783,960 | Fox | Dec. 9, 1930 |
| 1,962,767 | Crowley | June 12, 1934 |
| 2,241,351 | Indge et al. | May 6, 1941 |
| 2,320,377 | Mueller | June 1, 1943 |
| 2,412,141 | Ford | Dec. 3, 1946 |
| 2,673,423 | Hoyet | Mar. 30, 1954 |
| 2,690,034 | Laverdisse | Sept. 28, 1954 |